United States Patent [19] [11] 4,069,855
Petroshanoff [45] Jan. 24, 1978

[54] CAPTIVE PANEL FASTENER
[75] Inventor: George Petroshanoff, Torrance, Calif.
[73] Assignee: Tridair Industries, Torrance, Calif.
[21] Appl. No.: 774,404
[22] Filed: Mar. 4, 1977
[51] Int. Cl.² .............................................. F16B 43/00
[52] U.S. Cl. .................................................... 151/69
[58] Field of Search ..................... 151/69, 41.7, 41.75, 151/9, 48, 37; 85/1 K, 8.8, 1 P, 1 L; 29/437, 434, 521; 10/155 R

[56] References Cited
U.S. PATENT DOCUMENTS

| 2,119,520 | 6/1938 | Brokering | 85/1 K X |
| 3,294,140 | 12/1966 | Cosenza | 151/69 X |
| 3,995,675 | 12/1976 | Cosenza | 151/69 |

Primary Examiner—Ramon S. Britts
Attorney, Agent, or Firm—Thomas A. Seeman

[57] ABSTRACT

A stud-like captive panel fastener which a rigid, continuous, retaining ring may be installed on or removed from without deformation of the ring and which will not accidentally become dislodged from the fastener under normal usage. The fastener is formed with an enlarged head, keyways extending intermediate the ends of the fastener, installation slots extending from the leading end of the fastener and parallel to the keyways, and cross-channels connecting the installation slots and the keyways. After the fastener is inserted through an opening in a panel, the fastener is captivated to the panel by a rigid, continuous retaining ring which is placed on the fastener by first entering the tabs of the ring in the installation slots and then rotating the ring in a bayonet manner within the cross-channels until the tabs enter the keyways. The retaining ring is prevented from backing off the fastener through retrograde movement by the cross-channels beng staggered relative to one another in one embodiment and/or a depressible wire spring member positioned in one of the installation slots in a second embodiment. The wire spring member also functions as a "hold out" for the fastener when the fastener is retracted.

12 Claims, 10 Drawing Figures

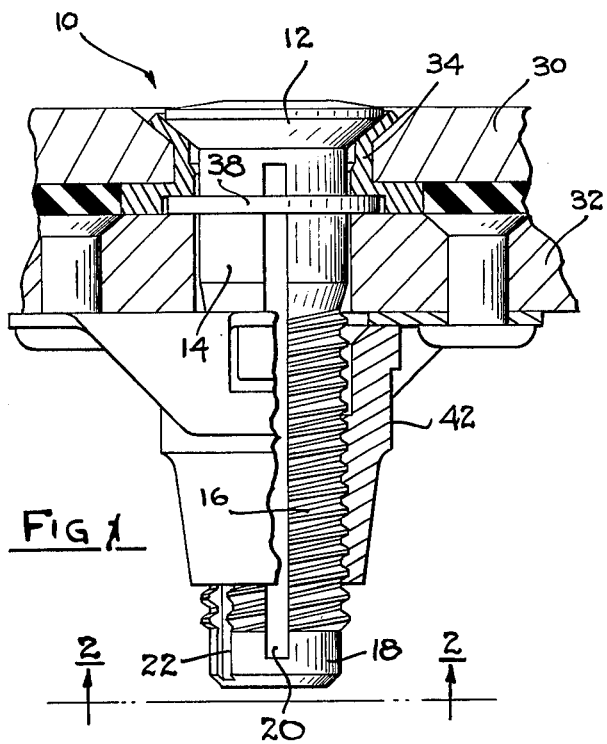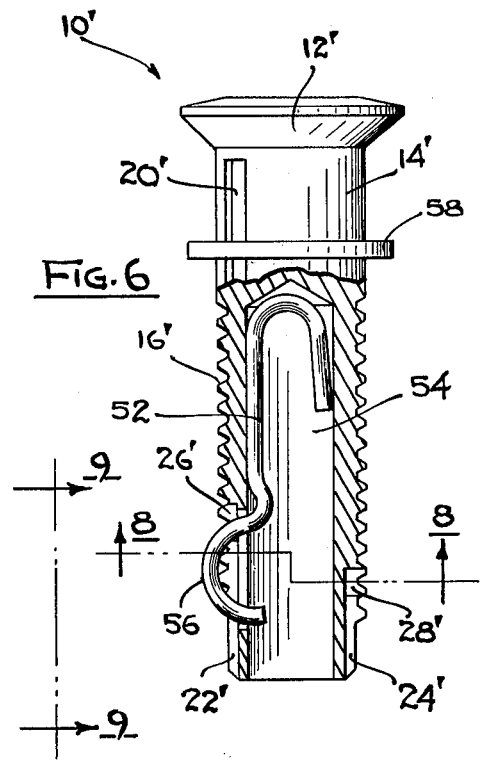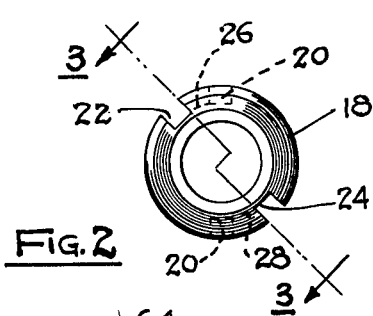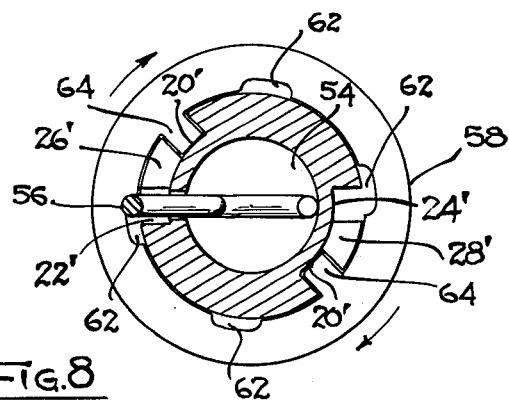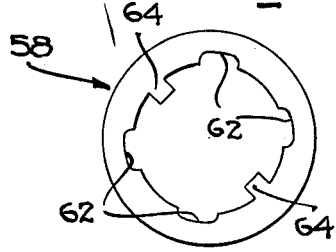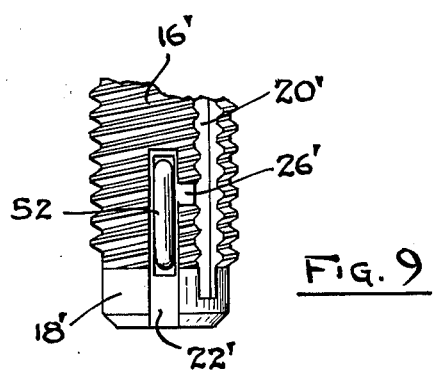

CAPTIVE PANEL FASTENER

BACKGROUND OF THE INVENTION

This invention relates to a captive panel fastener and more particularly, to such a fastener especially suitable for securing an aircraft panel and the like.

Aircraft captive panel fasteners are well known in the art. Conventionally, the fastener secures a panel to an aircraft by being inserted through an opening, which is smaller than the enlarged head of the fastener, of the panel and then engaged with a nut member attached to the base structure of the aircraft. To prevent the fastener from becoming displaced from the panel when the fastener is disengaged from the nut, the fastener is captivated to the panel by a retaining ring which carries integral keys or tabs that ride within keyways extending intermediate the ends of the fastener. After the fastener is inserted through the panel opening, the ring is snapped over the leading end of the fastener to engage the tabs with the keyways. One such panel fastener is shown in the U.S. Pat. No. 3,294,140.

A disadvantage of such prior panel fasteners is that the retaining ring must be relatively flexible and the tolerance between the ring and the fastener relatively loose to permit the tabs of the ring to be snapped over the leading end of the fastener and into the keyways. As a consequence, it has been found that in use, the retaining ring may accidentally snap off the fastener, particularly if the ring happens to be cocked at an angle when outward pressure is applied to the fastener. When this happens, the fastener may become dislodged from the panel and lost or could conceivably fall into a jet engine intake and possible damage the engine.

Although it has been known to slip a continuous rigid ring directly over the end of the fastener by extending the keyways through the end of the fastener and then afterwards inserting a flanged cap on the end of the fastener to retain the ring, installation of the flanged cap is objectionably time consuming.

It is also known to place a somewhat rigid, continuous ring on a fastener by deforming the tabs of the ring by bending them back during installation and subsequently straightening them into the keyways. However this is cumbersome and often results in a very loose fit between the ring and the fastener, as frequently the tabs are not fully straightened. Consequently, this type of ring also tends to become accidently displaced from the fastener.

SUMMARY OF THE INVENTION

Therefore, an object of this invention is to provide a captive panel fastener which a continuous, rigid retaining ring may conveniently be installed on or removed from without deformation of the ring, and which ring will not accidentally become dislodged from the fastener under normal usage.

A further object is to provide a method of installing a rigid, retaining ring on a fastener which can be done simply and quickly without the need of special tools.

Another object of this invention is to provide a captive panel fastener which is economical and feasible to manufacture.

Further objects of the invention will in part be obvious and will in part appear hereafter.

The foregoing objects are accomplished by providing a stud-like, captive panel fastener with an enlarged head, keyways extending along the shank of the fastener intermediate the ends of the fastener, installation slots extending through the leading end of the fastener and parallel to the keyways, and cross-channels interconnecting the keyways and installation slots. When captivating the fastener to a panel, the fastener is first placed through an opening in the panel. Afterwards, a continuous, rigid retaining ring with integral keys or tabs is placed on the fastener by first inserting the tabs of the retaining ring into the installation slots and then rotating the ring in a bayonet manner within the cross-channels until the tabs of the retaining ring enter the keyways. The retaining ring is then free to ride along the shank of the fastener between the closed ends of the keyways. The fastener is thus captivated to the panel by the enlarged head of the fastener lying on one side of the panel and the retaining ring on the other side.

To prevent the retaining ring from unintentionally backing off the fastener by retrograde movement, means are provided to block the ring from accidentally entering the installation slots. In one embodiment, the cross-channels are staggered relative to one another such that the ring must be tilted manually at a precise sharp angle prior to entering the cross-channels. To facilitate the entry of the retaining ring into the cross-channels, when it is desired during installation of the ring, one of the installation slots terminates at its juncture with one of the cross-channels, thereby functioning as a registration stop for proper entry alignment of the ring with the cross-channels.

In a second embodiment, a depressible wire spring member is located in one of the installation slots, in front of and blocking one of the cross-channels. The wire spring member, extending beyond the periphery of the fastener, also functions to hold the fastener in its retracted position by the contact of the spring member with the sidewall of the fastener opening in the panel when the fastener is pulled outwardly. This has certain advantages. By being held in a retracted position, the fastener does not interfere with the installation of the panel when the panel is being swung or slid into position over the panel opening on the aircraft, and secondly, the fastener is prevented from becoming damaged should the panel be slid over a flat surface when removed, which is often the case.

When installing or removing the retaining ring, the wire spring member is depressed to allow the ring to pass within the installation slots. For dual protective capability, the wire spring member in the installation slot may be coupled with staggered cross-channels.

The retaining ring used with the wire spring member in the second embodiment is preferably formed with recess along the inner perimeter of the ring to receive the wire spring member when the ring is passed over the spring member while slidably carried on the keyways. This assists in maintaining the retaining ring within the keyways as the recess wall keeps the retaining ring from rotating when alongside the cross-channels. In both embodiments, the retaining rings are of sufficient rigidity such that they will not become deformed and snap over the end of the fastener under normal usage. Owing to the simplicity of construction, the fastener is both economical and feasible to manufacture.

BRIEF DESCRIPTION OF THE DRAWING

For a fuller understanding of the nature and objects of the invention, reference should be made to the following detailed description taken in connection with the accompanying drawing in which:

FIG. 1 is an elevational view, partially in cross-section, showing the captive panel fastener constructed in accordance with the teachings of the invention in a typical assembly as when used to fasten a panel to an aircraft structure, only a portion of which panel and structure is shown;

FIG. 2 is a bottom view of the fastener taken along the line 2—2 of FIG. 1;

FIG. 6 is an elevational view, partially in cross-section, illustrating a second embodiment of the fastener modified with a depressible wire spring member, shown in detail, functioning to block the retaining ring from entering the installation slots by retrograde movement and also functioning to hold the fastener in a retracted position;

FIG. 7 is a plan view of the retaining ring shown in FIG. 6 and of the type preferably used with the second embodiment of the fastener;

FIG. 8 is an end view of the fastener taken along the line 8—8 of FIG. 6;

FIG. 9 is a sectional view of the bottom portion of the fastener taken along the line 9—9 of FIG. 6.

DETAILED DESCRIPTION OF PREFERRED EMBODIMENTS

Figure 3:
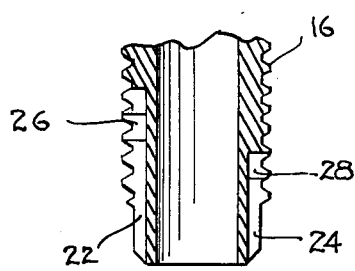
FIG. 3 is an fragmentary cross-sectional view of the bottom portion of the fastener taken along the line 3—3 of FIG. 2 particularly showing the manner in which the cross-channels are staggered relative to one another.

The invention accordingly comprises the features of construction, combination of elements, and arrangement of parts, which will be exemplified in the construction hereinafter set forth and the scope of the invention will be indicated in the claims.

Turning now to the drawings and referring first particularly to FIGS. 1-5, a preferred embodiment of the fastener embodying the present invention is designated generally by the reference numeral 10. The fastener is formed with a stud-like body having an enlarged head 12 at one end adapted to receive a drive tool, not shown, such as a screwdriver, allen wrench or the like.

Extending beneath the head 12 of the fastener in respective order is a smooth shank portion 14, a threaded portion 16, and a reduced diameter, smooth tip 18. The tip is of reduced diameter to facilitate entry into a nut member with which the fastener is to be threadably engaged. Lying intermediate the ends of the fastener are a pair of closed-ended keyways 20 that terminate adjacent the head of the fastener at one extremity and adjacent the leading end of the fastener at the other extremity. Extending through the lower end of the fastener and parallel to the keyways 20 are a pair of installation slots 22, 24, best seen in FIG. 5. Slots 22, 24 extend longitudinally from the end of the fastener and terminate in the lower threaded portion of the fastener at different levels. For ease of description, the longer installation slot 22 is referred to as the upper installation slot and the shorter installation slot 24 is referred to as the lower installation slot.

Connecting the installation slots 22, 24 and the keyways 20 are a pair of parallel, upper and lower cross-channels 26, 28 staggered relative to one another as shown. To minimize the length of the cross-channels, the installation slots 22, 24 are located adjacent to the keyways 20. As depicted in FIG. 3, the lower cross-channel 28 enters the installation slot 24 at the upper limit of the slot to facilitate the entry of the retaining ring within the cross-channels as will hereinafter be described in more detail. The base of keyways 20, installation slots 22, 24 and cross-channels 26, 28 are all of the same depth and preferably below the minor diameter of the fastener threads for uniform maximum penetration and holding power of the tabs of a retaining ring with which the fastener is intended to be engaged.

In FIG. 1, the fastener is shown in its preferred use of securing an aircraft panel 30 to an aircraft structure 32, only a portion of the panel and structure being shown. Panel 30 carries a grommet 34 about a fastener opening through which the fastener is inserted. The grommet is recessed within a countersink of the panel, and the head of the fastener, which is larger than the opening in the grommet, is configured to be received flush with the upper surface of the panel to minimize aerodynamic drag on the aircraft. A flange 36 provided at the bottom of the grommet functions as a spacer between the panel and the aircraft structure and is counterbored to receive a retaining ring 38. Attached to the aircraft structure 32 is a typical floating nut assembly 42 with which the fastener is threadably engaged.

Figure 4:
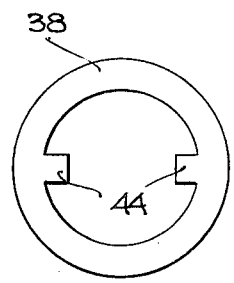
FIG. 4 is a plan view of the retaining ring shown in FIG. 1.

The retaining ring 38 with which the fastener is preferable used is shown in detail in FIG. 4. The ring having an external diameter larger than the fastener opening in the grommet is of the continuous type as opposed to a split ring, and includes opposed integral keys or tabs 44 as is conventional for such rings. However, the ring is substantially more rigid and thicker than conventional rings as the ring is not intended to be snapped over the end of the fastener or become deformed as are such prior rings. The retaining ring is sized to provide a close tolerance between the tabs of the ring and the base of the keyways to maximize the retention of the ring within the keyway 20.

Figure 5:
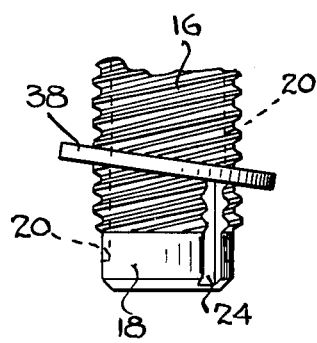
FIG. 5 is an elevational view of the bottom portion of the fastener shown in FIG. 1, particularly illustrating the position of the retaining ring when the tabs of the ring are within the cross-channels.

The fastener is captivated to the panel by first inserting the fastener through the fastener opening in the panel. Afterwards, retaining ring 38 is placed on the fastener by inserting the keys of the ring into the mating installation slots 22, 24 and then pushing the ring upwardly, as viewed, by hand until the key within the lower installation slot 24 is stopped by the upper extremity of the slot and the key in the opposite slot pushed upwardly to the extent possible. The diametrical distance between the tabs of the ring is predetermined such that when the ring is pushed upwardly as described the lower key of the retaining ring is in alignment with the lower cross-channel 28 and the upper key is in alginment with the upper cross-channel 26. Ring 28 is then rotated clockwise, as viewed, to pass the keys through the cross-channels (as seen in FIG. 5) and into the keyways 20 where the ring normally slidable rides between the upper and lower limits of the keyways. Although it is preferable to have the upper extremity of the lower installation slot 24 function as a registry slot for the retaining ring as described, it should be understood that instead the registry stop may be provided at the upper end of the upper installation slot 22 by terminating slot 22 at its juncture with the upper cross-channel 26. The fastener is thus captivated to the panel by the enlarged head of the fastener on one side of the panel and the retaining ring on the other side.

As should be obvious, the fastener fastens the panel to the aircraft by being threadably engaged with the nut member 42.

Functioning as a blocking means the staggered cross-channels effectively prevent the retaining ring from reentering the installation slots by accidental retrograde movement and thereafter being subsequently displaced from the fastener through the installation slot 22, 24. This is because the retaining ring must be at precise sharp angle before the ring can enter the channels and then must be rotated counterclockwise into the channels, which is highly unlikely to occur under normal usage. Yet, advantageously, the ring may easily be removed manually in the above manner when it is desired to do so.

Owing to the rigidity of the retaining ring 38, the relatively close tolerances between the keys 44 and the keyways 20, and the depth of the keys within the keyways, the ring will not snap over the end of the fastener under normal usage or otherwise become displaced therefrom.

A second embodiment of the fastener, generally indicated by the numeral 10', is illustrated in FIGS. 6–10. In this embodiment, a u-shaped spring member 52 made of heavy guage wire is located as shown within a closed bore 54 leading from the forward end of the fastener. One leg of the member is formed with a curved protruding bearing surface or portion 56 which is biased outwardly by the spring tension in the member through an outlet in the upper installation slot 22', and in front of and above the base of upper cross-channel 26'. The fastener is preferably used with a modified retaining ring 58. All other aspects of the fastener are as shown and described for the first embodiment and like parts are designated by the same number followed by a prime symbol.

Retaining ring 58, as best seen in FIG. 7, differs from ring 38 in that four recesses 62 are provided along the inner perimeter of the ring. The distance between each key 64 of the retaining ring and each recess 62 is fixed such that the bearing surface or portion 56 of the spring member will be beneath and in contact with the recess wall when the ring passes over the bearing surface while riding in the keyways. The engagement of the spring member with the recess wall functions as a guide or catch for the purpose of preventing the retaining ring from rotating in to the cross-channels when adjacent to the channels. Although four recesses are provided, only one recess wall is in contact with the spring member at any particular time. The other recesses are provided for convenience to insure that in any manner the retaining ring is installed, one of the recess walls will be in position to engage the bearing surface spring member.

Retaining ring 58 is installed on the fastener as described for the first embodiment. Tabs 64 of the ring are first inserted into the installation slots of the fastener and then moved upwardly as viewed. As the tab within upper installation slot 22' moves over the bearing surface 56 of the spring member, the surface is depressed inwardly. Then after the tabs are aligned with the cross-channels of the fastener, as described for the first embodiment, the ring is rotated through the cross-channels and into the keyways. When the tabs are in the keyways, bearing surface 56 of the spring member snaps back to its extended position. The retaining ring slidably rides on the fastener within the upper and lower limits of the keyways.

Although highly unlikely, if by chance ring 58 should accidentally override the spring member and enter the cross-channels through retrograde movement, the bearing surface 56 of the spring member, which is in front of the upper cross-channel, would effectively block the tabs of the ring from entering the installation slots. When it is desired to remove the ring, the bearing surface 56 may be easily depressed by hand and the ring removed through the installation slots. For the reasons stated when describing the first embodiment, the ring will not snap over the fastener or otherwise become disengaged under normal usage.

Figure 10:
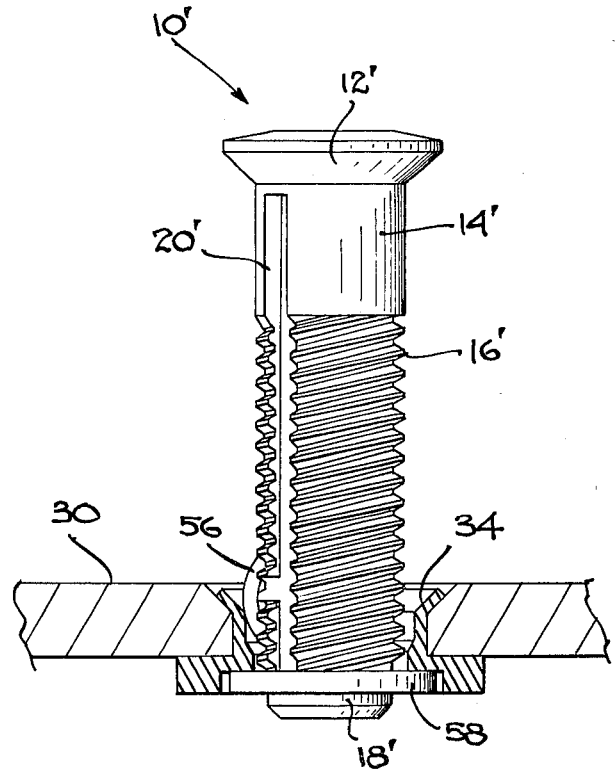
FIG. 10 is an elevational view of the fastener shown in FIG. 6 in combination with a panel, illustrating the manner in which the wire spring member functions to hold the fastener in a retracted position.

In addition to functioning as a means for blocking the retaining ring from entering the installation slots and being subsequently disengaged from the fastener as a result of retrograde movement, the spring member also functions as a "holdout" for the fastener when it is pulled outwardly to its retracted position. The bearing surface 58 of the spring member protrudes beyond the periphery of the fastener sufficiently to contact the side wall of the grommet in the fastener opening when the fastener is retracted, as shown in FIG. 10, with the retaining ring 60 abutting to the bottom at the grommet. By the contact of the bearing surface with the grommet wall, the spring tension in the spring member holds the fastener in the retracted position. A similar spring holdout is shown and described in a commonly assigned copending application by Frank Cosenza. To engage the nut member the fastener may merely be pushed downwardly.

Although the spring member is shown in combination with staggered cross-channels as a dual control against accidental displacement of the retaining ring through retrograde movement, it is to be understood that the spring member may also be utilized with aligned cross-channels, the spring member being the sole means of blocking the retaining ring against retrograde displacement.

As should also be apparent, although only two keyways and installation slots are shown for the embodiments of the invention, three or more may be provided with a corresponding number of keys or tabs on the retaining ring.

The foregoing detailed description is to be clearly understood as given by way of illustration and example only, the spirit and scope of the invention being limited solely by the appended claims.

I claim:
1. A captive panel fastener comprising:
 a. a stud-like member having a shank at least a portion of which is threaded and an enlarged head;
 b. two or more keyways extending longitudinally along a portion of the length of said stud-like member but intermediate the ends thereof;
 c. two or more installation slots extending longitudinally along a portion of the length of said stud-like member and through the leading end thereof, said installation slots and keyways spaced alternately about the periphery of said stud-like member;
 d. a cross-channel interconnecting each keyway with an adjoining installation slot, the distance between each keyway and its adjoining interconnected installation slot being substantially equal;

e. a retaining ring with integral tabs for retaining said stud-like member to a panel, said integral tabs of said retaining ring slidably carried within said keyways;

f. said integral tabs of the retaining ring slidably receivable within said cross-channels and installation slot, and said installation slot, cross-channels and keyways suitably interconnected with one another to provide an access path through which said tabs may enter said keyways during installation of the retaining ring without deformation of the ring; and g. blocking means for blocking retrograde reentry of said tabs within said installation slots.

2. The captive panel fastener of claim 1, wherein said blocking means is defined by one cross-channel being staggered relative to another cross-channel forming upper and lower cross-channels and said retaining ring is further defined as being continuous and substantially rigid.

3. The captive panel fastener of claim 2, wherein in one of said cross-channels interconnects its adjoining installation slot immediatley adjacent the upper extremity of said adjoining installation slot.

4. The captive panel fastener of claim 1, wherein said blocking means is defined as a depressible wire spring member having a portion thereof extending outwardly through an outlet in one of said installation slots and fronting one cross-channel and said retaining ring is further defined as being continuous and substantially rigid.

5. The captive panel fastener of claim 4, wherein said retaining ring further includes at least one recess along its inner periphery for operative engagement with said spring member when said tabs of said ring are within said keyways.

6. The captive panel fastener of claim 4, wherein a portion of said spring member extends radially beyond the outer diameter of said shank and is adapted to engage and hold the fastener when said portion of the spring member is in contact with a wall member.

7. The captive panel fastener of claim 4, wherein said blocking means is further defined by each cross-channel being staggered relative to one another forming upper and lower cross-channels.

8. The captive panel fastener of claim 6 in combination with a panel, said panel having a fastener opening with a diameter slightly larger than the major diameter of the threaded shank but smaller than the diameter of said enlarged head of the fastener, and the outwardly extending portion of the spring member contacting the sidewall of the fastener opening when the fastener is retracted and the fastener being held thereby against downward movement.

9. A captive panel fastener comprising:

a. a stud-like member having a shank at least a portion of which is threaded and an enlarged head;

b. two or more keyways extending longitudinally along a portion of the length of said stud-like member but intermediate the ends thereof;

c. two or more installation slots extending longitudinally along a portion of the length of said stud-like member and through the leading end thereof;

d. a cross-channel extending radially below said threads and interconnecting each keyway with an adjoining installation slot, the distance between each keyway and its adjoining interconnected installation slot being substantially equal;

e. said keyways, cross-channels and installation slots being approximately the same radial depth;

f. a retaining ring with integral tabs slidably carried in said keyways when installed on said stud-like member;

g. said integral tabs of the retaining ring slidably receivable within said cross-channels and installation slots, and said installation slots, cross-channels and keyways suitably interconnected with one another to provide an access path through which said tabs may enter said keyways during installation of the retaining ring without deformation of the ring; and h. blocking means for blocking retrograde reentry of said tabs within said installation slots.

10. The captive panel fastener of claim 9, wherein said blocking means is defined by said cross-channels being staggered relative to one another forming upper and lower cross-channels.

11. The captive panel fastener of claim 10, wherein one of said cross-channels interconnected a first of said installation slots immediately adjacent the upper extremity of said first installation slot.

12. The captive panel fastener of claim 9, wherein said blocking means is defined as a depressible wire spring member having a portion thereof extending outwardly through an outlet in one of said installation slots and fronting one of said cross-channels.

* * * * *